(No Model.)
J. G. FRIEDEMANN.
HARROW.
No. 280,303. Patented June 26, 1883.
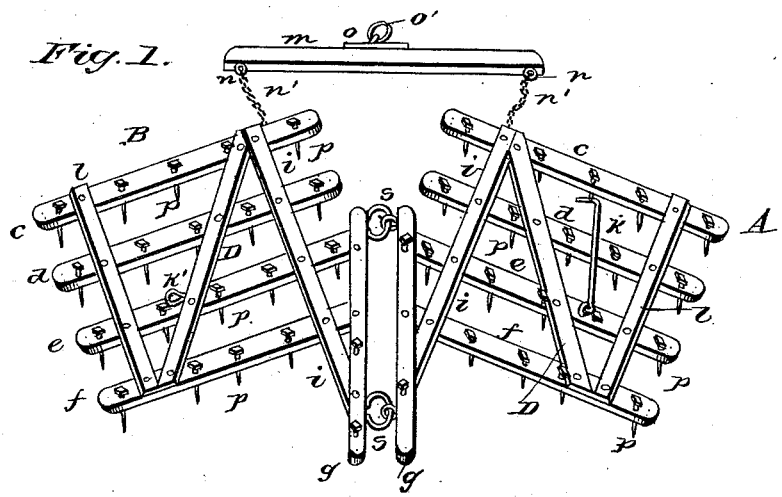
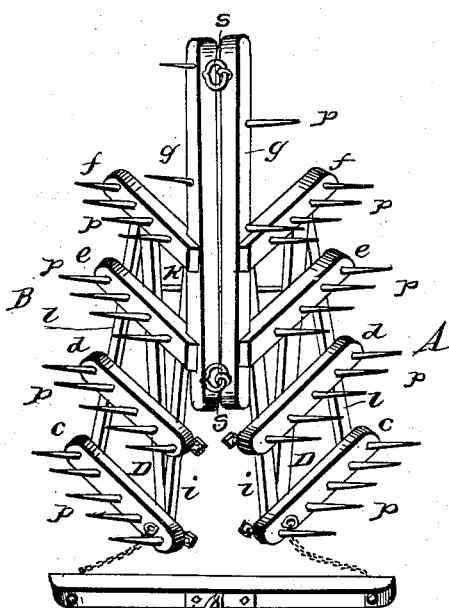
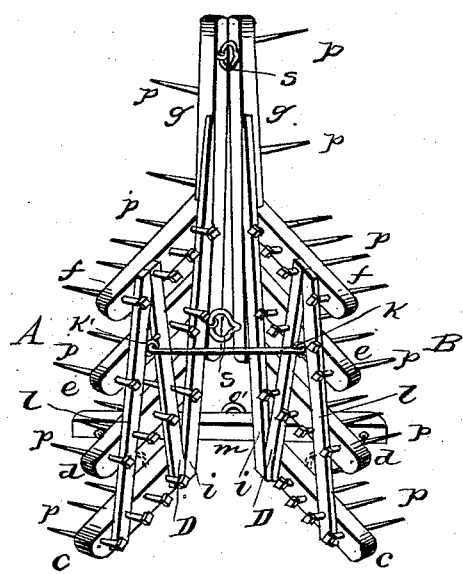
Witnesses:
Phil C. Dietrich
G. B. Harris
Inventor:
J. G. Friedemann
By J. O. McCleary,
Attorney.

UNITED STATES PATENT OFFICE.

JOHANN G. FRIEDEMANN, OF WAVERLY, ASSIGNOR TO AUGUST FRIEDEMANN, OF BREMER COUNTY, IOWA.

HARROW.

SPECIFICATION forming part of Letters Patent No. 280,303, dated June 26, 1883.

Application filed October 3, 1882. (No model.)

*To all whom it may concern:*

Be it known that I, JOHANN G. FRIEDEMANN, of Waverly, in the county of Bremer and State of Iowa, have invented certain new and useful Improvements in Harrows; and I do hereby declare the following to be a full, clear, and exact description of the invention, such as will enable others skilled in the art to which it pertains to make and use the same.

My invention relates to an improvement on the harrow shown and described in my Letters Patent No. 257,441, dated May 2, 1882. In said patent the two sections of the harrow are folded together for transportation, so that they will travel upon the parallel coupling-bars. This close folding of the sections renders the harrow liable to tip over during transportation.

The present invention consists in a harrow of the improved construction hereinafter described, and pointed out in the claims, whereby the sections may be folded and secured together in such a manner as to provide a sufficiently wide space between the sections to prevent their tipping over during transportation.

In the drawings, Figure 1 is a plan view of a harrow constructed in accordance with my invention. Figs. 2 and 3 illustrate, respectively, front and rear views of the same when folded for transportation.

The harrow consists of two sections, A and B, of the same construction, each having inclined main beams c, d, e, and f, and a coupling-beam, g, carrying teeth P, and being secured together by cross-ties l, i, and D. The rear ends of the cross-ties i project beyond the beams f, and are secured to the rear ends of the coupling-beams g. The latter are secured to the inner ends of beams e and f in such a manner as to leave a wide opening between the inner ends of the beams d d and c c. The sections A and B are connected by ordinary loop-bolts, S, passing through the coupling-beams g near the ends thereof.

An eye-plate, O, provided with a link, O', for the attachment of the team, is fastened at the middle of a draft-bar, m, the latter being attached, by means of hooks n at each end, and chains n', to the main front beams, c c, near the inner ends of the same, or at the corners of the sections.

K represents a coupling rod or hook secured to the beam e near the center of the section A, and designed to engage a loop or eye, K', secured upon the beam e of section B.

When it is desired to move the harrow from one field to another, the sections A and B are turned up on the front beams, c c, as shown in Figs. 2 and 3, and connected by the coupling device K K'. The beams c c thus constitute runners for the harrow. The chains n draw from the inside corners of sections A and B, so that the draft will come over the center of the sections, no matter in what direction the team is drawing, thus rendering it impossible to tip the sections upon each other. The coupling device K K' will hold the sections in suitable position, as shown, to carry all of the teeth clear of the ground and form a sled, thus avoiding the necessity of taking the harrow apart for transportation from field to field.

The device as above constructed is simple and inexpensive in construction and strong and durable in use.

Having fully described my invention, what I claim as new, and desire to secure by Letters Patent, is—

The combination, with two harrow-sections constructed as described, and having the parallel coupling-beams, of the draft-bar m and locking device K K', said sections being adapted to be folded and coupled and turned upon their front beams, so that the sections will travel at an angle to each other, substantially as set forth.

In testimony whereof I have signed this specification in the presence of two subscribing witnesses.

JOHANN G. FRIEDEMANN.

Witnesses:
S. F. BAKER,
HENRY KASEMEIER.